United States Patent
Sato (10) Patent No.: US 8,942,568 B2
(45) Date of Patent: Jan. 27, 2015

(54) OPTICAL COMMUNICATION APPARATUS

(75) Inventor: Shoichi Sato, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 107 days.

(21) Appl. No.: 13/880,769

(22) PCT Filed: Dec. 24, 2010

(86) PCT No.: PCT/JP2010/007492
§ 371 (c)(1),
(2), (4) Date: Apr. 22, 2013

(87) PCT Pub. No.: WO2012/085979
PCT Pub. Date: Jun. 28, 2012

(65) Prior Publication Data
US 2013/0209092 A1   Aug. 15, 2013

(51) Int. Cl.
H04B 10/12 (2006.01)
H04B 10/2507 (2013.01)
H04L 1/00 (2006.01)
H04J 14/02 (2006.01)
H04L 1/20 (2006.01)

(52) U.S. Cl.
CPC .......... H04B 10/2507 (2013.01); H04L 1/0001 (2013.01); H04L 1/20 (2013.01)
USPC .............................................. 398/147; 81/159

(58) Field of Classification Search
USPC .............. 398/29, 81, 147, 159, 148, 149, 150
See application file for complete search history.

(56) References Cited

U.S. PATENT DOCUMENTS

2007/0297804 A1* 12/2007 Honda et al. .................. 398/147
2009/0162074 A1* 6/2009 Nemoto ........................ 398/158

FOREIGN PATENT DOCUMENTS

| JP | 2006-135487 A | 5/2006 |
| JP | 2008 252750 | 10/2008 |
| JP | 2010 34830 | 2/2010 |
| JP | 2011-211516 A | 10/2011 |

OTHER PUBLICATIONS

International Search Report Issued Mar. 15, 2011 in PCT/JP10/07492 Filed Dec. 24, 2010.
Office Action issued May 21, 2013 in Japanese Patent Application No. 2012-549487 (with English-language translation).

* cited by examiner

Primary Examiner — Daniel Dobson
(74) Attorney, Agent, or Firm — Oblon, Spivak, McClelland, Maier & Neustadt, L.L.P.

(57) ABSTRACT

An apparatus has frame loss detecting unit 14 for detecting frame loss of a data frame; dispersion amount control request transmission device for transmitting, when the frame loss detecting device 14 detects the frame loss in an undetected state of an input break of an optical signal by optical input break detecting unit 13, an optical signal of a dispersion amount control request pattern to the opposite apparatus at a bit rate lower than that for transmitting the optical signal of the data frame until the frame loss becomes undetected state; and dispersion amount control request receiving device for receiving the optical signal of the dispersion amount control request pattern transmitted from the opposite apparatus, wherein dispersion compensator 21 controls the dispersion amount of transmission line between the apparatus and the opposite apparatus when the dispersion amount control request receiving device receives the optical signal of a specific pattern.

5 Claims, 6 Drawing Sheets

OPTICAL COMMUNICATION APPARATUS

TECHNICAL FIELD

The present invention relates to an optical communication apparatus that seeks to minimize the error rate of the opposite apparatus by controlling the dispersion amount of a transmission line.

BACKGROUND ART

Recently, with an increase of a network transmission rate, optical fiber communication systems have been spreading rapidly.

As general characteristics of an optical fiber, propagation velocity of light differs depending on its wavelength, and the propagation velocity of a shorter wavelength is usually faster.

Accordingly, the propagation velocity becomes lower as the wavelength becomes longer so that the receiving time at a receiving apparatus varies owing to slight difference in the wavelength.

The delay difference (wavelength dispersion) of light due to wavelength will bring about a waveform distortion and degrade a bit error characteristic.

As for the effect of the waveform distortion due to wavelength dispersion, although it is small in an optical transmission system with a comparatively low transmission rate, it increases in a recent high rate optical transmission system because the dispersion tolerance reduces with an increase of the bit rate.

In particular, at a transmission rate not less than 40 Gb/s, since the dispersion tolerance is low and deterioration of transmission performance occurs owing to slight changes in the dispersion amount due to changes in temperature, a high-accuracy dispersion compensation technique is necessary.

As a dispersion compensation method, there is a method of employing a dispersion compensating fiber with the same dispersion amount of the opposite sign so as to cancel out the dispersion amount of a transmission line, or a method of using a variable dispersion compensator capable of controlling the dispersion amount of a transmission line.

In the high-speed communication not less than 40 Gb/s, since it requires highly-accurate dispersion compensation, a variable dispersion compensator is generally used.

As for a place where a dispersion compensator is used, both the receiving apparatus side and transmission apparatus side are conceived.

When using the dispersion compensator at the receiving apparatus side, the received signal is decoded by providing a received distorted waveform with the dispersion amount of the opposite sign.

On the other hand, when using the dispersion compensator at the transmission apparatus side, the opposite sign dispersion amount is added in advance so as to cancel out the residual dispersion amount of the transmission line, thereby enabling the receiving apparatus side to receive a right signal (the method is referred to as a "dispersion pre-equalization method" from now on).

Figure 6:
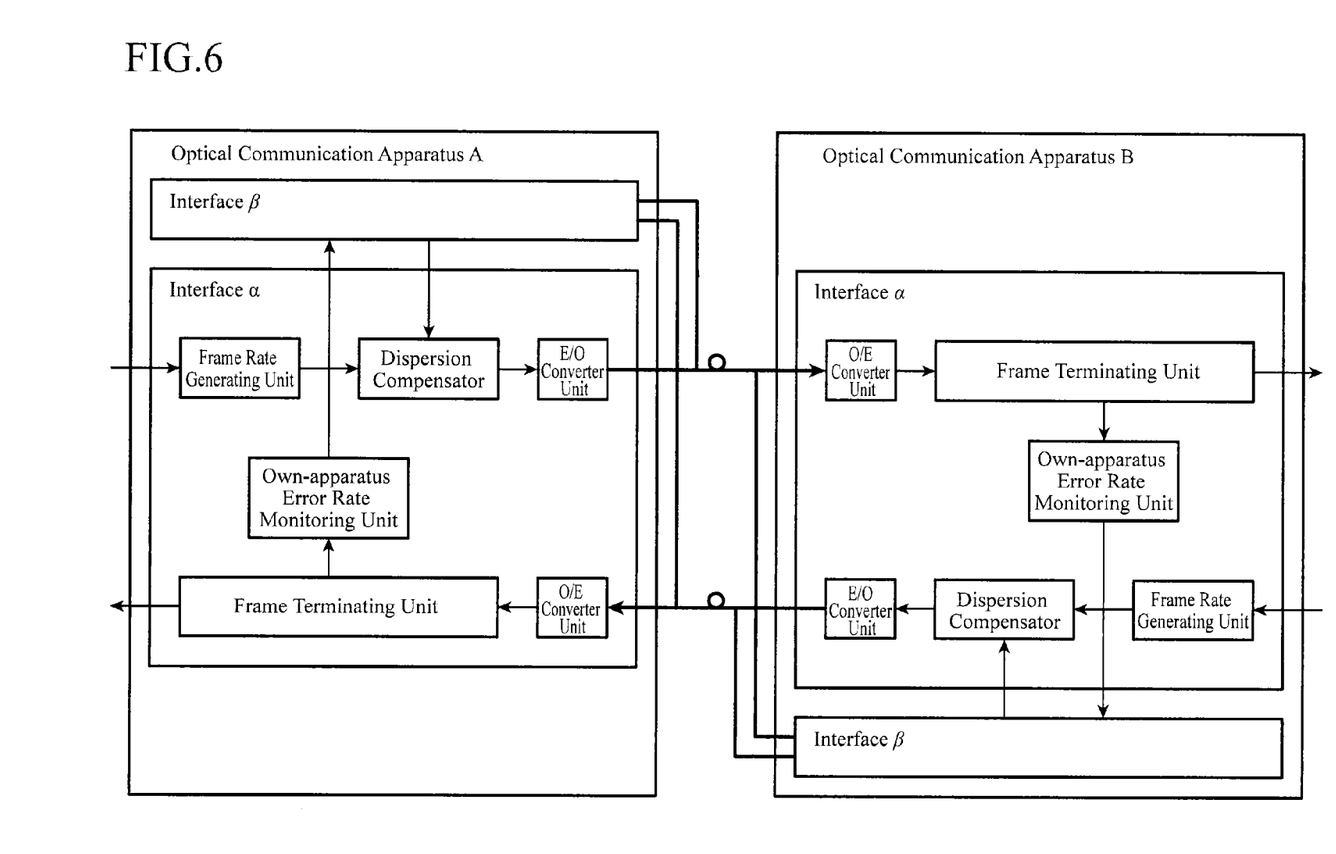
FIG. 6 is a block diagram showing a configuration of an optical communication apparatus disclosed in Patent Document 1.

In an optical transmission system employing the dispersion pre-equalization method as shown in FIG. 6, a dispersion compensator installed in an optical communication apparatus A on the transmission side controls the dispersion amount of a transmission line. To set the dispersion amount at the optimum value, it is necessary for an own-apparatus error rate monitoring unit installed in a receiving side optical communication apparatus B to monitor an error rate (signal error rate), and for the transmission side optical communication apparatus A to collect monitoring results (see Patent Document 1, for example).

PRIOR ART DOCUMENT

Patent Document

Patent Document 1: Japanese Patent Laid-Open No. 2010-34830 (see Paragraph No. [0009] and FIG. 1).

DISCLOSURE OF THE INVENTION

Problems to be Solved by the Invention

With the foregoing configuration, the conventional optical communication apparatus can cause the dispersion compensator to control the dispersion amount of the transmission line properly if the optical communication apparatus A on the transmission side can collect the error rates in the optical communication apparatus B on the receiving side. However, even if a transmission line is connected between interfaces α for the data transmission and reception between the optical communication apparatus A and optical communication apparatus B, unless the dispersion amount of the transmission line is set optimally, the main signal connection cannot be established. Thus, the transmission side optical communication apparatus A cannot collect the error rates in the receiving side optical communication apparatus B. Accordingly, besides the interfaces α for the data transmission and reception, the conventional optical communication apparatus has to incorporate second interfaces β for collecting the error rates, offering a problem of complicating the configuration of the apparatus.

In addition, if a failure occurs in the second interfaces β, a problem arises of being unable to control the dispersion amount of the transmission line.

The present invention is implemented to solve the foregoing problems. Therefore it is an object of the present invention to provide an optical communication apparatus capable of minimizing the error rate by controlling the dispersion amount of the transmission line without incorporating the second interfaces in addition to the interfaces for the data transmission and reception.

Means to Solve the Problems

An optical communication apparatus in accordance with the present invention comprises an optical signal receiving device for receiving an optical signal transmitted from an opposite apparatus; an optical input break detecting device for detecting an input break of the optical signal received by the optical signal receiving device; a frame loss detecting device for detecting a frame loss of a data frame indicated by the optical signal received by the optical signal receiving device; a dispersion amount control request transmission device for transmitting, if the frame loss detecting device detects the frame loss in an undetected state of the input break of the optical signal by the optical input break detecting device, an optical signal of a specific pattern indicating a dispersion amount control request to the opposite apparatus at a bit rate lower than a bit rate for transmitting the optical signal of the data frame until the frame loss becomes undetected state; and a dispersion amount control request receiving device for receiving the optical signal of the specific pattern which indicates the dispersion amount control request and is transmitted from the opposite apparatus, wherein when the dispersion amount control request receiving device receives the optical signal of the specific pattern, a dispersion amount control device controls the dispersion amount of a transmission line between the optical communication apparatus and the opposite apparatus.

Advantages of the Invention

According to the present invention, it is configured in such a manner as to comprise the optical signal receiving device for receiving an optical signal transmitted from the opposite apparatus; the optical input break detecting device for detecting an input break of the optical signal received by the optical signal receiving device; the frame loss detecting device for detecting a frame loss of a data frame indicated by the optical signal received by the optical signal receiving device; the dispersion amount control request transmission device for transmitting, if the frame loss detecting device detects the frame loss in an undetected state of the input break of the optical signal by the optical input break detecting device, the optical signal of the specific pattern indicating a dispersion amount control request to the opposite apparatus at a bit rate lower than the bit rate for transmitting the optical signal of the data frame until the frame loss becomes undetected state; and the dispersion amount control request receiving device for receiving the optical signal of the specific pattern which indicates the dispersion amount control request and is transmitted from the opposite apparatus, wherein when the dispersion amount control request receiving device receives the optical signal of the specific pattern, the dispersion amount control device controls the dispersion amount of a transmission line between the optical communication apparatus and the opposite apparatus. Accordingly, it offers an advantage of being able to minimize the error rate by controlling the dispersion amount of the transmission line without using other interfaces in addition to the interfaces for the data transmission and reception.

BEST MODE FOR CARRYING OUT THE INVENTION

Embodiment 1

Figure 1:
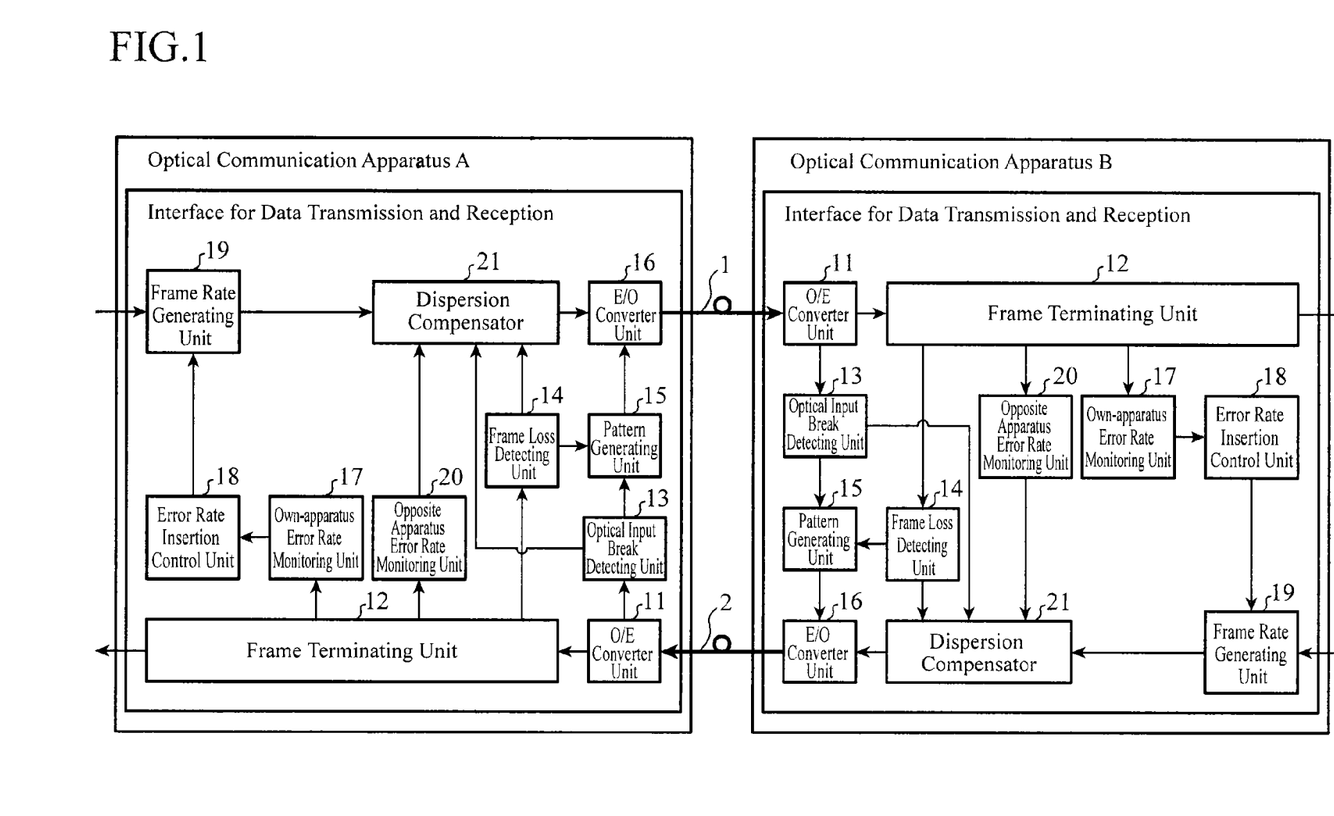
FIG. 1 is a block diagram showing a configuration of an optical communication apparatus of an embodiment 1 in accordance with the present invention.

FIG. 1 is a block diagram showing a configuration of an optical communication apparatus of an embodiment 1 in accordance with the present invention.

In the example of FIG. 1, an optical communication apparatus A and an optical communication apparatus B with the same configuration are connected via transmission lines (optical fibers) 1 and 2.

Although the optical communication apparatus A and the optical communication apparatus B incorporate an interface for data transmission and reception, they do not have a dedicated interface for controlling the dispersion amount of the transmission line.

In FIG. 1, an O/E converter unit 11 receives an optical signal transmitted from the opposite apparatus, and converts the optical signal to an electric signal. Incidentally, the O/E converter unit 11 constitutes an optical signal receiving device.

A frame terminating unit 12 terminates a data frame (data frame created by a frame generating unit 19 of the opposite apparatus) from the electric signal output from the O/E converter unit 11.

An optical input break detecting unit 13 monitors the electric signal supplied from the O/E converter unit 11 to detect an input break of the optical signal received by the O/E converter unit 11.

In addition, when the optical input break detecting unit 13 detects an input break of the optical signal corresponding to the dispersion amount control request pattern transmitted from the opposite apparatus by monitoring the electric signal supplied from the O/E converter unit 11, it supplies the detection signal of the dispersion amount control request pattern to a dispersion compensator 21.

Incidentally, the O/E converter unit 11 and the optical input break detecting unit 13 constitute an optical input break detecting device and a dispersion amount control request receiving device.

A frame loss detecting unit 14 detects the frame loss of the data frame by monitoring the data frame terminated by the frame terminating unit 12.

Incidentally, the frame terminating unit 12 and the frame loss detecting unit 14 constitute a frame loss detecting device.

A pattern generating unit 15 generates a dispersion amount control request pattern when the frame loss detecting unit 14 detects the frame loss in a state in which the optical input break detecting unit 13 has not yet detect the input break of the optical signal, and supplies the dispersion amount control request pattern to an E/O converter unit 16 repeatedly until entering a state in which the frame loss is not detected.

In this case, since the pattern generating unit 15 transmits the optical signal of the dispersion amount control request pattern at a bit rate lower than the bit rate of transmitting the optical signal of the data frame (transmits at a transmission rate not greater than a quarter of the transmission rate of the data frame, for example), the pattern generating unit 15 generates the dispersion amount control request pattern for the E/O converter unit 16 to turn on and off the light at a frequency of about several tens to several hundred Mb/s.

Receiving the electric signal indicating the data frame generated by the frame generating unit 19, the E/O converter unit 16 converts the electric signal to an optical signal and transmits the optical signal through the transmission line 1 (or the transmission line 2). On the other hand, receiving the dispersion amount control request pattern from the pattern generating unit 15, the E/O converter unit 16 turns the light on and off in response to the dispersion amount control request pattern, thereby transmitting an optical signal corresponding to the dispersion amount control request pattern through the transmission line 1 (or transmission line 2).

Incidentally, the pattern generating unit 15 and the E/O converter unit 16 constitute a dispersion amount control request transmission device.

An own-apparatus error rate monitoring unit 17 detects the error rate of the own-apparatus by monitoring the data frame terminated by the frame terminating unit 12.

An error rate insertion control unit 18 supplies the frame rate generating unit 19 with an instruction to insert the error rate of the own-apparatus detected by the own-apparatus error rate monitoring unit 17 into the overhead area in the data frame (area open to a user).

The frame rate generating unit 19 generates a data frame containing data to be transmitted to the opposite apparatus side, and inserts the error rate of the own-apparatus into the overhead area in the data frame under the instruction of the error rate insertion control unit 18.

An opposite apparatus error rate monitoring unit 20 acquires the error rate of the opposite apparatus from the overhead area in the data frame terminated by the frame terminating unit 12.

Receiving the detection signal of the dispersion amount control request pattern from the optical input break detecting unit 13, the dispersion compensator 21 controls the dispersion amount of the transmission line 1 (or the transmission line 2) by altering the dispersion value to be provided to the transmission line 1 (or transmission line 2) (by gradually altering the dispersion value from the minimum value to the maximum value within a dispersible range, for example).

More specifically, when the detection signal of the dispersion amount control request pattern is supplied from the optical input break detecting unit 13, the dispersion compensator 21 starts rough control of the dispersion amount on the transmission line 1 (or the transmission line 2), and when the detection signal of the dispersion amount control request pattern is no longer output from the optical input break detecting unit 13, the dispersion compensator 21 carries out fine tuning of the dispersion amount on the transmission line 1 (or the transmission line 2) in such a manner as to minimize the error rate of the opposite apparatus acquired by the opposite apparatus error rate monitoring unit 20.

Incidentally, the opposite apparatus error rate monitoring unit 20 and dispersion compensator 21 constitute a dispersion amount control device.

It is assumed in the example of FIG. 1 that the components of the optical communication apparatus, that is, the O/E converter unit 11, frame terminating unit 12, optical input break detecting unit 13, frame loss detecting unit 14, pattern generating unit 15, E/O converter unit 16, own-apparatus error rate monitoring unit 17, error rate insertion control unit 18, frame rate generating unit 19, opposite apparatus error rate monitoring unit 20 and dispersion compensator 21 are each constructed from a dedicated hardware (such as a semiconductor integrated circuit incorporating a CPU or a single-chip microcomputer). However, if the optical communication apparatus is composed of a computer, it may be configured in such a manner that all or part of programs describing the processing contents of the O/E converter unit 11, frame terminating unit 12, optical input break detecting unit 13, frame loss detecting unit 14, pattern generating unit 15, E/O converter unit 16, own-apparatus error rate monitoring unit 17, error rate insertion control unit 18, frame rate generating unit 19, opposite apparatus error rate monitoring unit 20 and dispersion compensator 21 can be stored in a memory of the computer so that the CPU of the computer can execute the programs stored in the memory.

Next, the operation will be described.

As the bit rate of the main signal rises, the effect of the wavelength dispersion becomes larger, thereby increasing the deterioration of the transmission performance and impeding the conduction of the main signal On the other hand, as the bit rate falls, the effect of the wavelength dispersion becomes smaller, thereby reducing the deterioration of the transmission performance and facilitating the conduction of the main signal as compared with the case where the bit rate is high.

Thus, to be almost free from the wavelength dispersion, the optical communication apparatuses A and B of the present embodiment 1 are configured in such a manner that the E/O converter unit 16 generates the dispersion amount control request pattern for turning the light on and off at a frequency of about several tens to several hundred Mb/s, and transmits the dispersion amount control request pattern to the opposite apparatus, that is, the optical communication apparatus B or A, at the low bit rate.

The following will give concrete details of the processing of the optical communication apparatuses A and B.

The transmission lines 1 and 2 connect between the optical communication apparatus A and the optical communication apparatus B. The dispersion amount of the transmission line 1 is controlled by the dispersion compensator 21 of the optical communication apparatus A, and the dispersion amount of the transmission line 2 is controlled by the dispersion compensator 21 of the optical communication apparatus B.

In a state where the transmission lines 1 and 2 between the optical communication apparatus A and the optical communication apparatus B are not connected, the O/E converter unit 11 of the optical communication apparatus A or B cannot receive the optical signal transmitted from the opposite apparatus, that is, the optical communication apparatus B or A. Accordingly, the optical input break detecting unit 13 of the optical communication apparatus A or B detects the input break of the optical signal received by the WE converter unit 11.

After that, when the transmission lines 1 and 2 are connected between the optical communication apparatus A and the optical communication apparatus B, the input break of the optical signal by the optical input break detecting unit 13 of the optical communication apparatus A or B becomes undetected state.

Since the control method of the dispersion amount of the transmission line 1 by the dispersion compensator 21 of the optical communication apparatus A is the same as the control method of the dispersion amount of the transmission line 2 by the dispersion compensator 21 of the optical communication apparatus B, the control method of the dispersion amount of the transmission line 1 will be described below.

The frame rate generating unit 19 of the optical communication apparatus A generates a data frame containing data to be transmitted to the optical communication apparatus B side, and supplies the data frame to the dispersion compensator 21.

Receiving the data frame from the frame rate generating unit 19, the dispersion compensator 21 of the optical communication apparatus A adds a prescribed dispersion value to the data frame.

Receiving the data frame to which the prescribed dispersion value is added from the dispersion compensator 21, the E/O converter unit 16 of the optical communication apparatus A converts the data frame from an electric signal to an optical signal, and outputs the optical signal to the transmission line 1.

Thus, the optical signal output from the optical communication apparatus A propagates through the transmission line 1 and arrives at the optical communication apparatus B.

Receiving the optical signal transmitted from the optical communication apparatus A, the O/E converter unit 11 of the optical communication apparatus B converts the optical signal to an electric signal.

When the O/E converter unit 11 converts the optical signal to the electric signal, the frame terminating unit 12 of the optical communication apparatus B terminates the data frame (the data frame generated by the frame generating unit 19 of the optical communication apparatus A) from the electric signal.

The frame loss detecting unit 14 of the optical communication apparatus B detects a frame loss of the data frame by monitoring the data frame terminated by the frame terminating unit 12. For example, unless the dispersion value the dispersion compensator 21 of the optical communication apparatus A adds is an appropriate value and unless a connection is established between the optical communication apparatus A and the optical communication apparatus B, it detects the frame loss of the data frame.

For convenience of explanation, it is assumed in the present embodiment 1 that the connection is not established, and that the frame loss detecting unit 14 detects the frame loss of the data frame.

Incidentally, since the detecting processing of the frame loss itself is a publicly known technique, detailed description thereof is omitted.

The pattern generating unit 15 of the optical communication apparatus B generates the dispersion amount control request pattern when the frame loss detecting unit 14 detects the frame loss in an undetected state of the input break of the optical signal by the optical input break detecting unit 13 (a state in which the transmission line 2 is connected between the optical communication apparatus A and the optical communication apparatus B), and supplies the dispersion amount control request pattern to the E/O converter unit 16.

Figure 2:
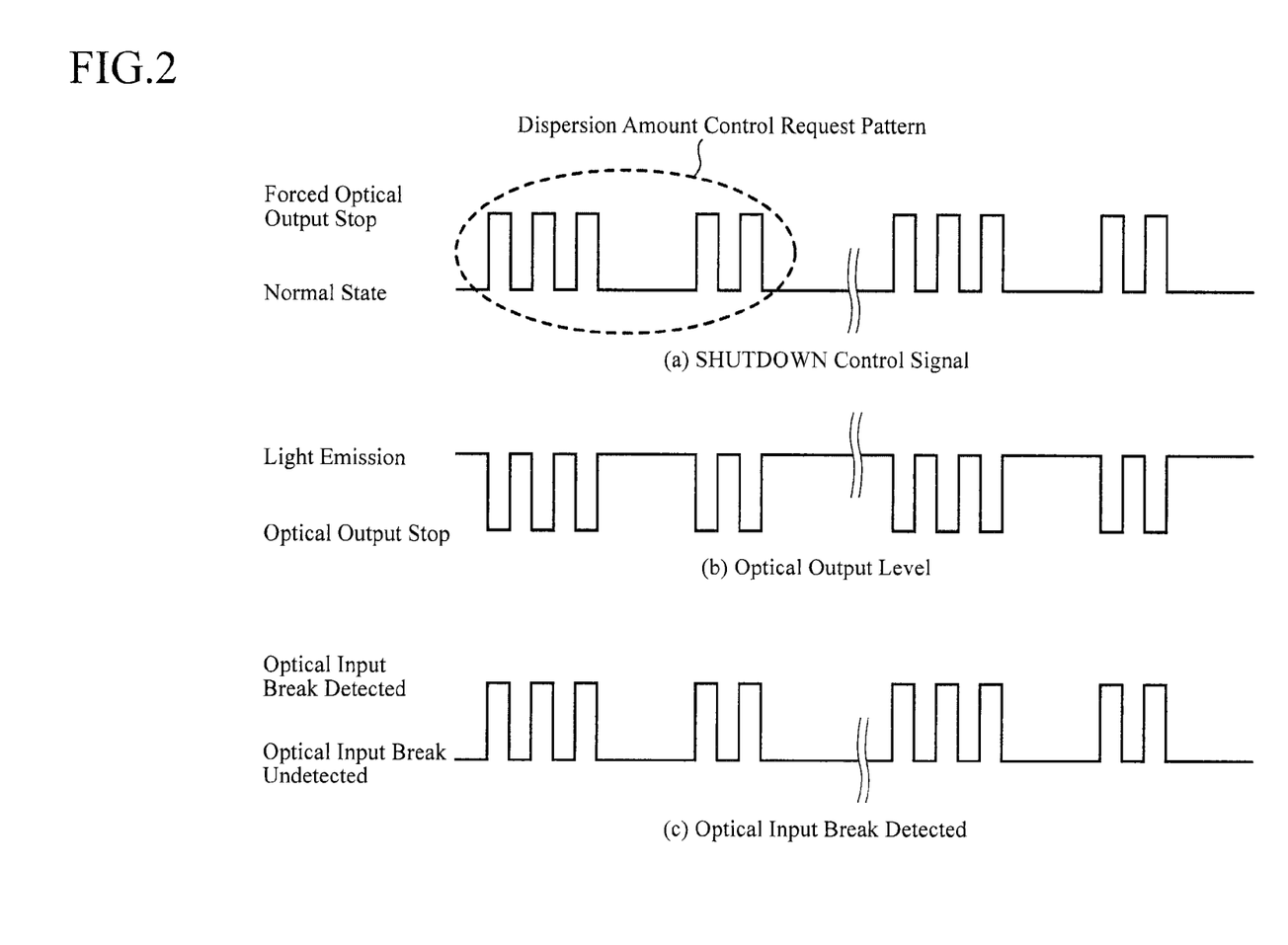
FIG. 2 is a diagram illustrating an example of a dispersion amount control request pattern and others.

Here, since the pattern generating unit 15 transmits the optical signal of the dispersion amount control request pattern at a bit rate lower than the bit rate of transmitting the optical signal of the data frame (at a transmission rate not greater than a quarter of the transmission rate of the data frame, for example), it generates the dispersion amount control request pattern that will cause the E/O converter unit 16 to turn the light on and off at a frequency of about several tens to several hundred Mb/s. FIG. 2 (a) shows an example of the dispersion amount control request pattern.

Incidentally, the pattern generating unit 15 supplies the dispersion amount control request pattern to the E/O converter unit 16 repeatedly until the frame loss detecting unit 14 no longer detects a frame loss.

Receiving the dispersion amount control request pattern from the pattern generating unit 15, the E/O converter unit 16 of the optical communication apparatus B turns the light on and off in accordance with the dispersion amount control request pattern, thereby outputting the optical signal corresponding to the dispersion amount control request pattern to the transmission line 2.

More specifically, the E/O converter unit 16 turns the light on and off by carrying out forced optical output stop control (SHUTDOWN control) as shown in FIG. 2(a) in accordance with the dispersion amount control request pattern output from the pattern generating unit 15.

Thus, the signal level of the optical signal output from the E/O converter unit 16 to the transmission line 2 is as shown in FIG. 2(b).

Since the optical signal output from the E/O converter unit 16 to the transmission line 2 is turned on and off at a low frequency, it is transmitted to the opposite apparatus, that is, the optical communication apparatus A, without any significant effect of the wavelength dispersion.

Receiving the optical signal transmitted from the optical communication apparatus B, the O/E converter unit 11 of the optical communication apparatus A converts the optical signal to an electric signal.

The optical input break detecting unit 13 of the optical communication apparatus A detects an input break of the optical signal corresponding to the dispersion amount control request pattern transmitted from the optical communication apparatus B by monitoring the electric signal supplied from the O/E converter unit 11 (see FIG. 2(c)), and supplies the detection signal of the dispersion amount control request pattern to the dispersion compensator 21.

Receiving the detection signal of the dispersion amount control request pattern from the optical input break detecting unit 13, the dispersion compensator 21 of the optical communication apparatus A starts the rough control of the dispersion amount on the transmission line 1 to alter the dispersion value to be provided to the transmission line 1.

For example, it gradually increases the dispersion value to be provided to the transmission line 1 from the minimum value to the maximum value within the dispersible range (200-300 ps/nm, for example), thereby controlling the dispersion amount of the transmission line 1.

Although the example is shown here in which the dispersion compensator 21 starts the rough control of the dispersion amount when it receives the detection signal of the dispersion amount control request pattern once from the optical input break detecting unit 13, it is also possible to start the rough control of the dispersion amount by receiving the detection signal of the dispersion amount control request pattern a plurality of times from the optical input break detecting unit 13.

The frame loss detecting unit 14 of the optical communication apparatus B continues to detect the frame loss of the data frame, and when the connection between the optical communication apparatus A and the optical communication apparatus B is established because the dispersion compensator 21 of the optical communication apparatus A starts the rough control of the dispersion amount and its dispersion amount becomes an approximately appropriate value, the detection state of the frame loss is changed to "undetected".

As described above, although the pattern generating unit 15 of the optical communication apparatus B supplies the dispersion amount control request pattern to the E/O converter unit 16 repeatedly, if the detection state of the frame loss by the frame loss detecting unit 14 is changed to "undetected", it stops supplying the dispersion amount control request pattern to the E/O converter unit 16.

When the pattern generating unit 15 stops supplying the dispersion amount control request pattern, the E/O converter unit 16 of the optical communication apparatus B alters its output level to a light-emitting state.

The optical input break detecting unit 13 of the optical communication apparatus A continues monitoring the electric signal supplied from the O/E converter unit 11, and when the output level of the E/O converter unit 16 of the optical communication apparatus B is changed to light-emitting state, the detection state of the input break of the optical signal corresponding to dispersion amount control request pattern is changed to "undetected".

When the dispersion compensator 21 of the optical communication apparatus A stops receiving the detection signal of the dispersion amount control request pattern from the optical input break detecting unit 13 because the detection state in the optical input break detecting unit 13 is changed to "undetected", it completes the rough control of the dispersion amount.

However, even if the rough control of the dispersion amount has been completed, since the dispersion amount of the transmission line 1 is not yet optimally controlled, it starts fine tuning of the dispersion amount.

The processing contents relating to the fine tuning of the dispersion amount on the transmission line 1 will be described concretely below.

When a connection is established between the optical communication apparatus A and the optical communication apparatus B, the data frame generated by the frame generating unit 19 of the optical communication apparatus A is transmitted to the optical communication apparatus B, and is terminated by the frame terminating unit 12 of the optical communication apparatus B.

On the other hand, the data frame generated by the frame generating unit 19 of the optical communication apparatus B is transmitted to the optical communication apparatus A, and is terminated by the frame terminating unit 12 of the optical communication apparatus A.

When the detection state of the frame loss by the frame loss detecting unit 14 is changed to "undetected", the own-apparatus error rate monitoring unit 17 of the optical communication apparatus B monitors the data frame terminated by the frame terminating unit 12, thereby detecting the error rate of the own-apparatus.

The error rate insertion control unit 18 of the optical communication apparatus B supplies, when the own-apparatus error rate monitoring unit 17 detects the error rate of the own-apparatus, the frame rate generating unit 19 with an instruction to insert the error rate into the overhead area in the data frame (area open to a user).

The frame rate generating unit 19 of the optical communication apparatus B inserts the error rate of the own-apparatus into the overhead area in the data frame under the instruction of the error rate insertion control unit 18, and supplies the data frame after the error rate insertion to the dispersion compensator 21.

Receiving the data frame from the frame rate generating unit 19, the dispersion compensator 21 of the optical communication apparatus B adds to the data frame a prescribed dispersion value (such as the dispersion value passing through the rough control at the time when the rough control is completed or the current dispersion value during the fine tuning).

Receiving the data frame to which the dispersion value is added by the dispersion compensator 21, the E/O converter unit 16 of the optical communication apparatus B converts the data frame from the electric signal to an optical signal, and outputs the optical signal to the transmission line 2.

Thus, the optical signal output from the optical communication apparatus B propagates through the transmission line 2 and arrives at the optical communication apparatus A.

Receiving the optical signal transmitted from the optical communication apparatus B, the O/E converter unit 11 of the optical communication apparatus A converts the optical signal to an electric signal.

When the O/E converter unit 11 converts the optical signal to the electric signal, the frame terminating unit 12 of the optical communication apparatus A terminates the data frame (the data frame generated by the frame generating unit 19 of the optical communication apparatus B) from the electric signal.

When the frame terminating unit 12 terminates the data frame, the opposite apparatus error rate monitoring unit 20 of the optical communication apparatus A acquires the error rate of the optical communication apparatus B from the overhead area in the data frame.

When the opposite apparatus error rate monitoring unit 20 acquires the error rate of the optical communication apparatus B, the dispersion compensator 21 of the optical communication apparatus A carries out the fine tuning of the dispersion value to be added to the data frame supplied from the frame rate generating unit 19 in such a manner as to minimize the error rate, thereby trying to optimize the dispersion amount on the transmission line 1.

Although the present embodiment 1 shows an example in which the optical communication apparatus A controls the dispersion amount on the transmission line 1, the control of the dispersion amount on the transmission line 2 is carried out in the same manner except that the processing contents of the optical communication apparatus A and the optical communication apparatus B are reversed.

Thus, the error rate can be minimized by controlling the dispersion amount on the transmission line 1 or 2 by the optical communication apparatus A or B.

As is clear from the foregoing description, according to the present embodiment 1, it is configured in such a manner that it comprises the O/E converter unit 11 for receiving the optical signal transmitted from the opposite apparatus; the optical input break detecting unit 13 for detecting the input break of the optical signal received by the O/E converter unit 11; the frame loss detecting unit 14 for detecting the frame loss of the data frame indicated by the optical signal received by the O/E converter unit 11; the dispersion amount control request transmission device for transmitting, when the frame loss detecting unit 14 detects the frame loss in the undetected state of the input break of the optical signal by the optical input break detecting unit 13, the optical signal of the dispersion amount control request pattern to the opposite apparatus at a bit rate lower than the bit rate for transmitting the optical signal of the data frame until the frame loss becomes undetected state; and the dispersion amount control request receiving device for receiving the optical signal of the dispersion amount control request pattern, which is transmitted from the opposite apparatus, and that when the dispersion amount control request receiving device receives the optical signal with the specific pattern, the dispersion compensator 21 controls the dispersion amount of the transmission line between the opposite apparatuses. Accordingly, it offers an advantage of being able to minimize the error rate by controlling the dispersion amount of the transmission line without incorporating a second interface in addition to the interface for the data transmission and reception.

Embodiment 2

Although the foregoing embodiment 1 shows an example in which the E/O converter unit 16 carries out the forced optical output stop control (SHUTDOWN control) in accordance with the dispersion amount control request pattern supplied from the pattern generating unit 15 to turn the light on and off, it is also possible to control the signal level of the optical signal to be transmitted in accordance with the dispersion amount control request pattern.

Figure 3:
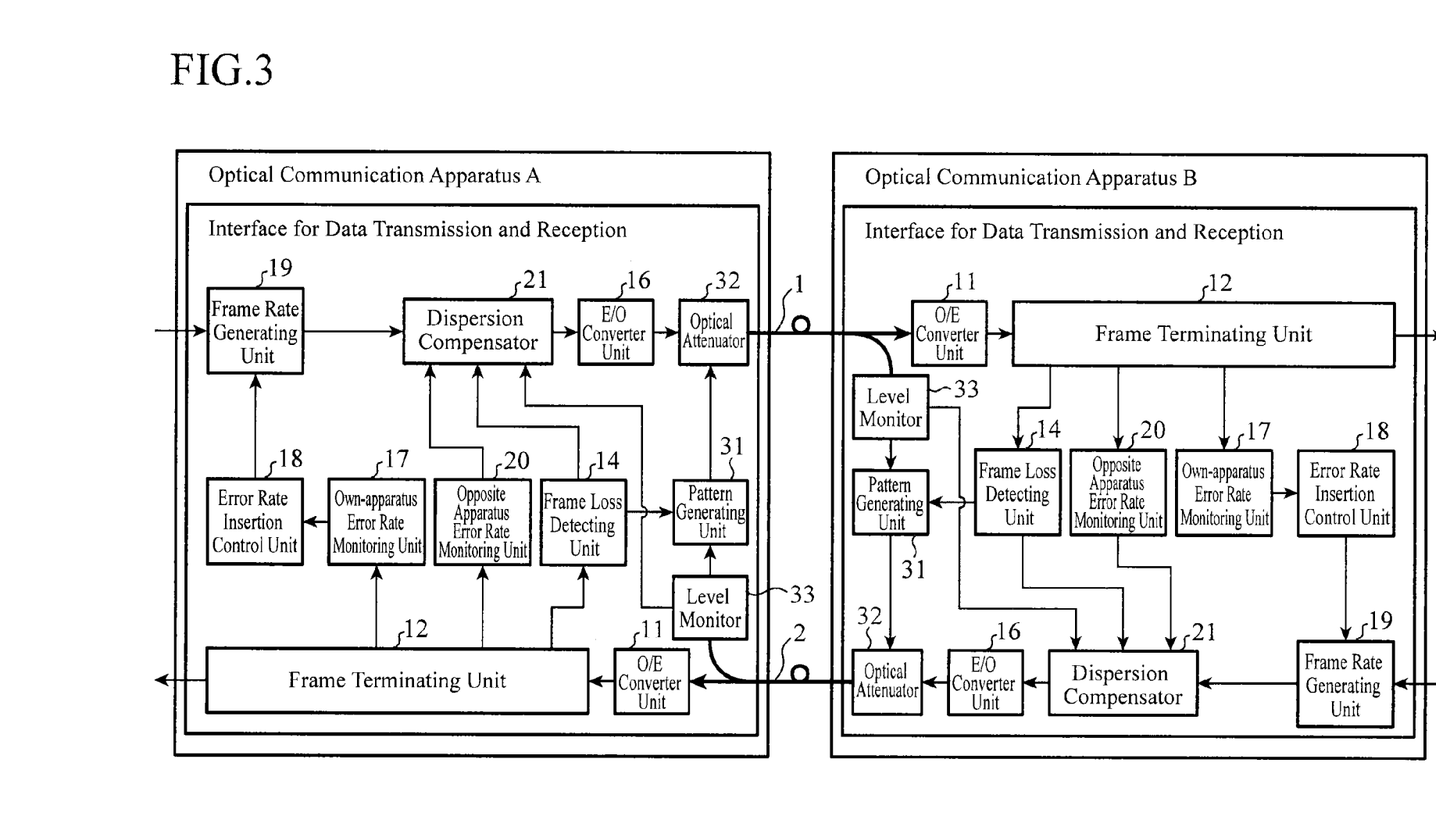
FIG. 3 is a block diagram showing a configuration of an optical communication apparatus of an embodiment 2 in accordance with the present invention.

FIG. 3 is a block diagram showing a configuration of an optical communication apparatus of an embodiment 2 in accordance with the present invention, in which the same reference symbols as those of FIG. 1 designate the same or like portions, and their description will be omitted.

When the frame loss detecting unit 14 detects the frame loss in the undetected state of the input break of the optical signal by the level monitor 33, the pattern generating unit 31 generates the dispersion amount control request pattern, and controls the amount of attenuation of the optical signal output from the optical attenuator 32 in accordance with the dispersion amount control request pattern until the frame loss becomes undetected state.

In this case, to transmit the optical signal of the dispersion amount control request pattern at a bit rate lower than the bit rate of transmitting the optical signal of the data frame (transmit at a transmission rate not greater than a quarter of the transmission rate of the data frame, for example), the pattern generating unit 31 generates the dispersion amount control request pattern with its signal level varying at a frequency of about several tens to several hundred Mb/s.

As for the optical signal supplied from the E/O converter unit 16, the optical attenuator 32 outputs it to the transmission line 1 (or the transmission line 2) without attenuation. On the other hand, as for the optical signal to be output to the transmission line 1 (or the transmission line 2) under the instruction of the pattern generating unit 31, the optical attenuator 32 controls the amount of attenuation thereof.

Incidentally, the pattern generating unit 31 and the optical attenuator 32 constitute a dispersion amount control request transmission device.

The level monitor 33 monitors the signal level of the transmission line 1 (or the transmission line 2) to detect the input break of the optical signal.

In addition, when the level monitor 33 detects a variation in the signal level corresponding to the dispersion amount control request pattern transmitted from the opposite apparatus by monitoring the signal level on the transmission line 1 (or the transmission line 2), it supplies the detection signal of the dispersion amount control request pattern to the dispersion compensator 21.

Incidentally, the level monitor 33 constitutes an optical input break detecting device and a dispersion amount control request receiving device.

It is assumed in the example of FIG. 3 that the components of the optical communication apparatus, that is, the O/E converter unit 11, frame terminating unit 12, level monitor 33, frame loss detecting unit 14, pattern generating unit 31, optical attenuator 32, E/O converter unit 16, own-apparatus error rate monitoring unit 17, error rate insertion control unit 18, frame rate generating unit 19, opposite apparatus error rate monitoring unit 20 and dispersion compensator 21 are each constructed from a dedicated hardware (such as a semiconductor integrated circuit incorporating a CPU or a single-chip microcomputer). However, if the optical communication apparatus is composed of a computer, it may be configured in such a manner that all or part of programs describing the processing contents of the O/E converter unit 11, frame terminating unit 12, level monitor 33, frame loss detecting unit 14, pattern generating unit 31, optical attenuator 32, E/O converter unit 16, own-apparatus error rate monitoring unit 17, error rate insertion control unit 18, frame rate generating unit 19, opposite apparatus error rate monitoring unit 20 and dispersion compensator 21 can be stored in a memory of the computer so that the CPU of the computer can execute the programs stored in the memory.

Next, the operation will be described.

Here, since the components other than the pattern generating unit 31, optical attenuator 32 and level monitor 33 are the same as those of the foregoing embodiment 1, the processing contents of the pattern generating unit 31, optical attenuator 32 and level monitor 33 will be chiefly described.

In a state where the transmission line 1 or 2 is not connected between the optical communication apparatus A and the optical communication apparatus B, the level monitor 33 of the optical communication apparatus A or B detects the input break of the optical signal.

After that, when the transmission line 1 or 2 is connected between the optical communication apparatus A and the optical communication apparatus B, the input break of the optical signal to be detected by the level monitor 33 of the optical communication apparatus A or B becomes undetected state.

In the present embodiment 2 also, the processing contents for controlling the dispersion amount of the transmission line 1 will be described.

The pattern generating unit 31 of the optical communication apparatus B generates the dispersion amount control request pattern when the frame loss detecting unit 14 detects the frame loss in the undetected state of the input break of the optical signal by the level monitor 33 (the state in which the transmission line 2 is connected between the optical communication apparatus A and the optical communication apparatus B).

Figure 4:
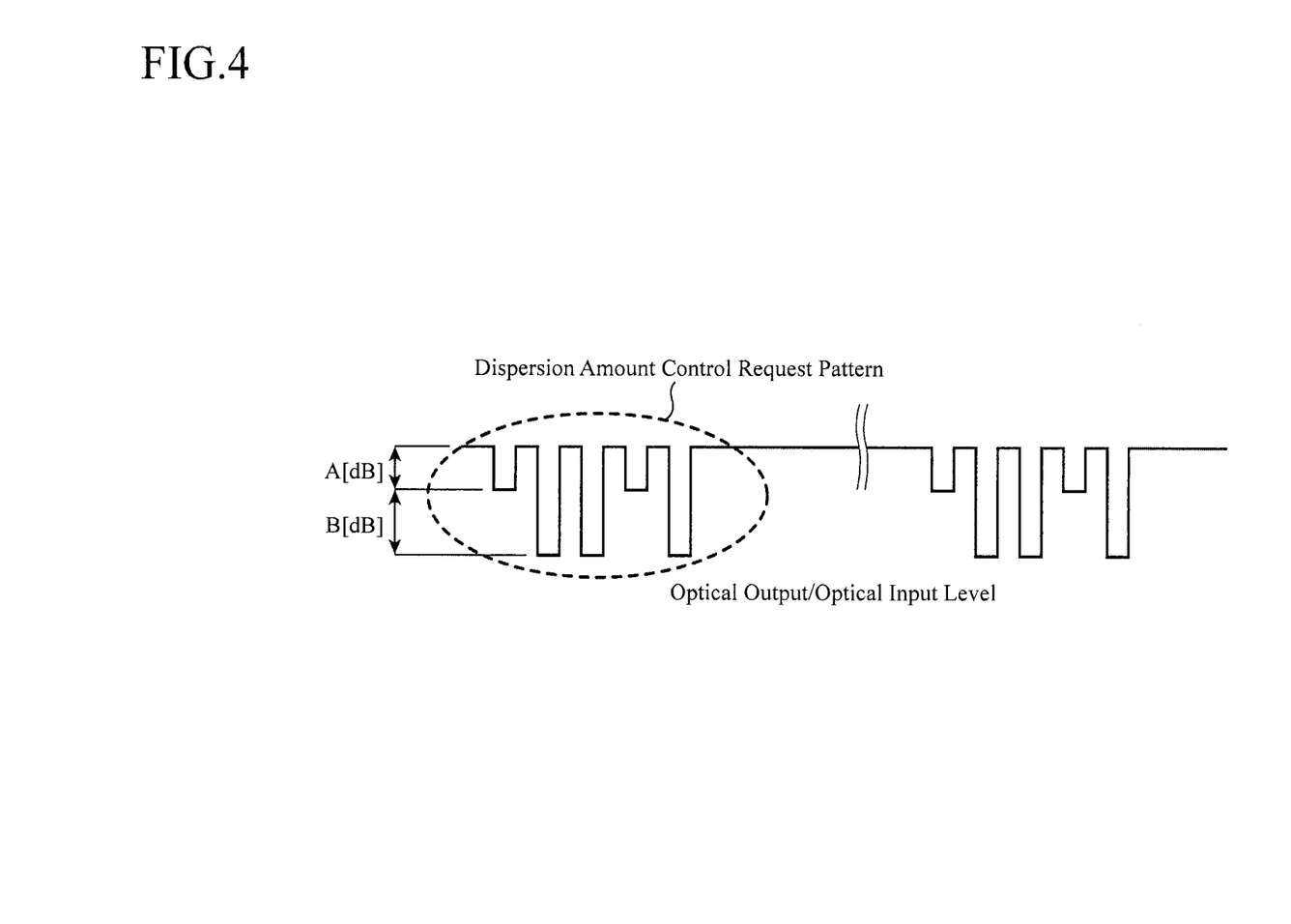
FIG. 4 is a diagram illustrating an example of a dispersion amount control request pattern.

Here, to transmit the optical signal of the dispersion amount control request pattern at a bit rate lower than the bit rate of transmitting the optical signal of the data frame (at a transmission rate not greater than a quarter of the transmission rate of the data frame, for example), the pattern generating unit 31 generates the dispersion amount control request pattern that will vary its signal level at a frequency of about several tens to several hundred Mb/s. FIG. 4 is a diagram illustrating an example of the dispersion amount control request pattern.

More specifically, to output the optical signal that changes its signal level at a frequency of about several tens to several hundred Mb/s to the transmission line 2, the pattern generating unit 31 controls the amount of attenuation of the optical signal output from the optical attenuator 32 in accordance with the dispersion amount control request pattern generated.

In the example of FIG. 4, the optical signal with its signal level varying at three steps (optical signal with signal levels of 0 [dB], B [dB] and A+B [dB]) is output to the transmission line 2.

Incidentally, in the same manner as the pattern generating unit 15 of FIG. 1, the pattern generating unit 31 continues to control the amount of attenuation of the optical attenuator 32 so as to output the optical signal corresponding to the dispersion amount control request pattern to the transmission line 2 repeatedly until the frame loss detecting unit 14 no longer detects a frame loss.

When the level monitor 33 of the optical communication apparatus A detects a variation in the signal level corresponding to the dispersion amount control request pattern transmitted from the optical communication apparatus B by monitoring the signal level of the transmission line 2, it supplies the detection signal of the dispersion amount control request pattern to the dispersion compensator 21.

Receiving the detection signal of the dispersion amount control request pattern from the level monitor 33, the dispersion compensator 21 of the optical communication apparatus A starts the rough control of the dispersion amount on the transmission line 1, and alters the dispersion value to be provided to the transmission line 1.

For example, it alters the dispersion value to be provided to the transmission line 1 by gradually increasing it within the dispersible range (200-300 ps/nm, for example) from its minimum value to its maximum value, thereby controlling the dispersion amount of the transmission line 1.

Since the processing contents thereafter are the same as those of the foregoing embodiment 1, their detailed description will be omitted.

As is clear from the foregoing description, according to the present embodiment 2, since it is configured in such a manner as to control the signal level of the optical signal to be transmitted in accordance with the dispersion amount control request pattern, it offers an advantage of being able to form a unique dispersion amount control request pattern with a signal sequence shorter than that when turning the light on and off simply in accordance with the dispersion amount control request pattern.

Embodiment 3

Figure 5:
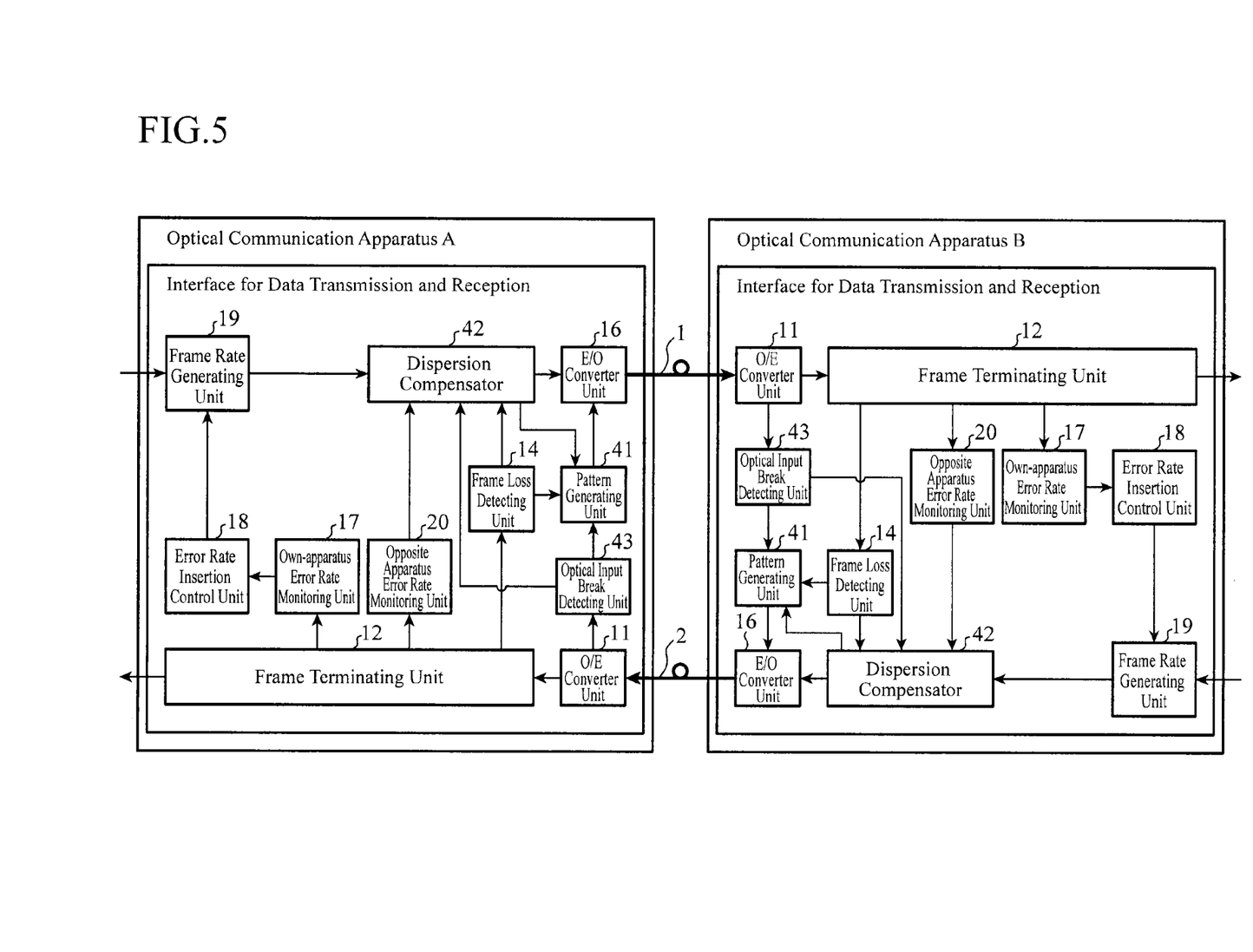
FIG. 5 is a block diagram showing a configuration of an optical communication apparatus of an embodiment 3 in accordance with the present invention.

FIG. 5 is a block diagram showing a configuration of an optical communication apparatus of an embodiment 3 in accordance with the present invention, in which the same reference symbols as those of FIG. 1 designate the same or like portions, and their description will be omitted.

When the frame loss detecting unit 14 detects the frame loss in the undetected state of the input break of the optical signal by an optical input break detecting unit 43, a pattern generating unit 41 generates a dispersion amount control request pattern and supplies the dispersion amount control request pattern to the E/O converter unit 16.

In this case, to transmit the optical signal of the dispersion amount control request pattern at a bit rate lower than the bit rate of transmitting the optical signal of the data frame (transmit at a transmission rate not greater than a quarter of the transmission rate of the data frame, for example), the pattern generating unit 41 generates the dispersion amount control request pattern that will cause the E/O converter unit 16 to turn the light on and off at a frequency of about several tens to several hundred Mb/s.

In addition, if the frame loss detection continues at the time when the optical input break detecting unit 43 detects a specific pattern indicating the control completion of the dispersion amount (referred to as a "dispersion amount control completion pattern" from now on), the pattern generating unit 41 supplies the dispersion amount control request pattern to the E/O converter unit 16, again. The dispersion amount control completion pattern is a unique specific pattern different from the dispersion amount control request pattern.

In addition, each time a dispersion compensator 42 carries out the rough control of the dispersion amount on the transmission line 1 (or the transmission line 2), the pattern generating unit 41 supplies the dispersion amount control completion pattern to the E/O converter unit 16.

Incidentally, the E/O converter unit 16 and the pattern generating unit 41 constitute a dispersion amount control request transmission device and a control completion notification device.

Receiving the detection signal of the dispersion amount control request pattern from the optical input break detecting unit 43, the dispersion compensator 42 alters the dispersion value to be provided to the transmission line 1 (or the transmission line 2) only once, thereby carrying out the processing of controlling the dispersion amount of the transmission line 1 (or the transmission line 2).

More specifically, when the optical input break detecting unit 43 outputs the detection signal of the dispersion amount control request pattern, the dispersion compensator 21 carries out the rough control of the dispersion amount on the transmission line 1 (or the transmission line 2) only once, and when the optical input break detecting unit 43 stops outputting the detection signal of the dispersion amount control request pattern, it executes the fine tuning of the dispersion amount on the transmission line 1 (or the transmission line 2) in such a manner as to minimize the error rate of the opposite apparatus, which is acquired from the opposite apparatus error rate monitoring unit 20.

Incidentally, the opposite apparatus error rate monitoring unit 20 and the dispersion compensator 42 constitute a dispersion amount control device.

The optical input break detecting unit 43 detects the input break of the optical signal received by the O/E converter unit 11 by monitoring the electric signal supplied from the O/E converter unit 11.

In addition, when the optical input break detecting unit 43 monitors the electric signal supplied from the O/E converter unit 11 and detects the input break of the optical signal corresponding to the dispersion amount control request pattern transmitted from the opposite apparatus, it supplies the detection signal of the dispersion amount control request pattern to the dispersion compensator 42, and when it detects the input break of the optical signal corresponding to the dispersion amount control completion pattern transmitted from the opposite apparatus, it supplies the detection signal of the dispersion amount control completion pattern to the pattern generating unit 41.

Incidentally, the O/E converter unit 11 and the optical input break detecting unit 43 constitute an optical input break detecting device and a dispersion amount control request receiving device.

It is assumed in the example of FIG. 5 that the components of the optical communication apparatus, that is, the O/E converter unit 11, frame terminating unit 12, optical input break detecting unit 43, frame loss detecting unit 14, pattern generating unit 41, E/O converter unit 16, own-apparatus error rate monitoring unit 17, error rate insertion control unit 18, frame rate generating unit 19, opposite apparatus error rate monitoring unit 20 and dispersion compensator 42 are each constructed from a dedicated hardware (such as a semiconductor integrated circuit incorporating a CPU or a single-chip microcomputer). However, if the optical communication apparatus is composed of a computer, it may be configured in such a manner that all or part of programs describing the processing contents of the O/E converter unit 11, frame terminating unit 12, optical input break detecting unit 43, frame loss detecting unit 14, pattern generating unit 41, E/O converter unit 16, own-apparatus error rate monitoring unit 17, error rate insertion control unit 18, frame rate generating unit 19, opposite apparatus error rate monitoring unit 20 and dispersion compensator 42 can be stored in a memory of the computer so that the CPU of the computer can execute the programs stored in the memory.

Although the optical communication apparatus A or B of FIG. 5 shows an example that incorporates the optical input break detecting unit 43, pattern generating unit 41 and dispersion compensator 42 instead of the optical input break detecting unit 13, pattern generating unit 15 and dispersion compensator 21 in the optical communication apparatuses A and B of FIG. 1, it can also incorporate the optical input break detecting unit 43, pattern generating unit 41 and dispersion compensator 42 instead of the optical input break detecting unit 13, pattern generating unit 15 and dispersion compensator 21 in the optical communication apparatuses A and B of FIG. 3.

Next, the operation will be described.

Since the control method of the dispersion amount of the transmission line 1 by the dispersion compensator 42 of the optical communication apparatus A is the same as the control method of the dispersion amount of the transmission line 2 by the dispersion compensator 42 of the optical communication apparatus B, the control method of the dispersion amount of the transmission line 1 will be described below.

In the same manner as in the foregoing embodiment 1, the O/E converter unit 11 of the optical communication apparatus B receives the optical signal transmitted from the optical communication apparatus A, and converts the optical signal to an electric signal.

When the O/E converter unit 11 converts the optical signal to the electric signal, the frame terminating unit 12 of the optical communication apparatus B terminates the data frame (data frame generated by the frame generating unit 19 of the optical communication apparatus A) from the electric signal.

The frame loss detecting unit 14 of the optical communication apparatus B monitors the data frame terminated by the frame terminating unit 12 to detect the frame loss of the data frame in the same manner as in the foregoing embodiment 1. Thus, unless the dispersion value added by the dispersion compensator 42 of the optical communication apparatus A is an appropriate value and unless a connection is established between the optical communication apparatus A and the optical communication apparatus B, it detects the frame loss of the data frame.

In the present embodiment 3, for convenience of explanation, the following description will be made on the assumption that the connection has not yet been established and that the frame loss detecting unit 14 detects the frame loss of the data frame.

In the same manner as the pattern generating unit 15 of FIG. 1, when the frame loss detecting unit 14 detects the frame loss in the state where the input break of the optical signal is not detected by the optical input break detecting unit 43 (in the state where the transmission line 2 is connected between the optical communication apparatus A and the optical communication apparatus B), the pattern generating unit 41 of the optical communication apparatus B generates a dispersion amount control request pattern (see FIG. 2 (*a*)) and supplies the dispersion amount control request pattern to the E/O converter unit 16.

Unlike the pattern generating unit 15 of FIG. 1, however, the pattern generating unit 41 supplies the dispersion amount control request pattern to the E/O converter unit 16 only once.

Receiving the dispersion amount control request pattern from the pattern generating unit 41, the E/O converter unit 16 of the optical communication apparatus B turns the light on and off as in the foregoing embodiment 1 in accordance with the dispersion amount control request pattern, thereby outputting the optical signal corresponding to the dispersion amount control request pattern to the transmission line 2.

More specifically, the E/O converter unit 16 turns the light on and off by carrying out the forced optical output stop control (SHUTDOWN control) as shown in FIG. 2(*a*) in accordance with the dispersion amount control request pattern supplied from the generating unit 41.

The O/E converter unit 11 of the optical communication apparatus A receives the optical signal transmitted from the optical communication apparatus B and converts the optical signal to an electric signal.

In the same manner as the optical input break detecting unit 13 of FIG. 1, when the optical input break detecting unit 43 of the optical communication apparatus A detects the input break of the optical signal (see FIG. 2(*c*)) corresponding to the dispersion amount control request pattern transmitted from the optical communication apparatus B by monitoring the electric signal supplied from the O/E converter unit 11, it supplies the detection signal of the dispersion amount control request pattern to the dispersion compensator 42.

Receiving the detection signal of the dispersion amount control request pattern from the optical input break detecting unit 43, the dispersion compensator 42 of the optical communication apparatus A starts the rough control of the dispersion amount on the transmission line 1, and alters the dispersion value to be provided to the transmission line 1 only once.

For example, it executes the rough control of the dispersion amount on the transmission line 1 by altering the dispersion value to be provided to the transmission line 1 only once within the dispersible range (200-300 ps/nm, for example).

When the dispersion compensator 42 carries out the rough control of the dispersion amount on the transmission line 1 once, the pattern generating unit 41 of the optical communication apparatus A supplies the dispersion amount control completion pattern to the E/O converter unit 16.

Receiving the dispersion amount control completion pattern from the pattern generating unit 41, the E/O converter unit 16 of the optical communication apparatus A turns the light on and off in accordance with the dispersion amount control completion pattern, thereby outputting the optical signal corresponding to the dispersion amount control completion pattern to the transmission line 1.

The O/E converter unit 11 of the optical communication apparatus B receives the optical signal transmitted from the optical communication apparatus A and converts the optical signal to an electric signal.

When the optical input break detecting unit 43 of the optical communication apparatus B detects the input break of the optical signal corresponding to the dispersion amount control completion pattern transmitted from the optical communication apparatus A by monitoring the electric signal supplied from the O/E converter unit 11, it supplies the detection signal of the dispersion amount control completion pattern to the pattern generating unit 41.

The frame loss detecting unit 14 of the optical communication apparatus B continues detecting the frame loss of the data frame, and changes the detection state of the frame loss to "undetected" when the connection between the optical communication apparatus A and the optical communication apparatus B is established because the rough control of the dispersion amount carried out by the dispersion compensator 42 of the optical communication apparatus A sets the dispersion amount at about an appropriate value.

At this stage, however, for convenience of explanation, the following explanation will be made on the assumption that the frame loss detection continues.

The pattern generating unit 41 of the optical communication apparatus B, receiving the detection signal of the dispersion amount control completion pattern from the optical input break detecting unit 43, supplies, if the frame loss detection continues at that point, the dispersion amount control request pattern (see FIG. 2 (*a*)) to the E/O converter unit 16 again.

Receiving the dispersion amount control request pattern from the pattern generating unit 41, the E/O converter unit 16 of the optical communication apparatus B turns the light on and off in accordance with the dispersion amount control request pattern, thereby outputting the optical signal corresponding to the dispersion amount control request pattern to the transmission line 2.

The O/E converter unit 11 of the optical communication apparatus A receives the optical signal transmitted from the optical communication apparatus B and converts the optical signal to an electric signal.

When the optical input break detecting unit 43 of the optical communication apparatus A continues monitoring the electric signal supplied from the O/E converter unit 11 and detects the input break of the optical signal (see FIG. 2 (*c*))

corresponding to the dispersion amount control request pattern transmitted from the optical communication apparatus B, it supplies the detection signal of the dispersion amount control request pattern to the dispersion compensator 42.

Receiving the detection signal of the dispersion amount control request pattern from the optical input break detecting unit 43, the dispersion compensator 42 of the optical communication apparatus A alters the dispersion value to be provided to the transmission line 1 once again.

When the dispersion compensator 42 carries out the rough control of the dispersion amount on the transmission line 1 once, the pattern generating unit 41 of the optical communication apparatus A supplies the dispersion amount control completion pattern to the E/O converter unit 16.

Receiving the dispersion amount control completion pattern from the pattern generating unit 41, the E/O converter unit 16 of the optical communication apparatus A turns the light on and off in accordance with the dispersion amount control completion pattern, thereby outputting the optical signal corresponding to the dispersion amount control completion pattern to the transmission line 1.

The O/E converter unit 11 of the optical communication apparatus B receives the optical signal transmitted from the optical communication apparatus A and converts the optical signal to an electric signal.

When the optical input break detecting unit 43 of the optical communication apparatus B detects the input break of the optical signal corresponding to the dispersion amount control completion pattern transmitted from the optical communication apparatus A by continuously monitoring the electric signal supplied from the O/E converter unit 11, it supplies the detection signal of the dispersion amount control completion pattern to the pattern generating unit 41.

The frame loss detecting unit 14 of the optical communication apparatus B continues detecting the frame loss of the data frame, and changes the detection state of the frame loss to "undetected" when the connection between the optical communication apparatus A and the optical communication apparatus B is established because the rough control of the dispersion amount carried out by the dispersion compensator 42 of the optical communication apparatus A sets the dispersion amount at about an appropriate value.

At this stage, however, for convenience of explanation, the following explanation will be made on the assumption that the frame loss detection is changed to "undetected".

The pattern generating unit 41 of the optical communication apparatus B does not supply the dispersion amount control request pattern to the E/O converter unit 16 if the detection state of the frame loss by the frame loss detecting unit 14 has already been changed to "undetected" when the pattern generating unit 41 receives the detection signal of the dispersion amount control completion pattern from the optical input break detecting unit 43.

Unless the dispersion amount control request pattern is supplied from the pattern generating unit 41, the E/O converter unit 16 of the optical communication apparatus B has its output level set at a light-emitting state.

The optical input break detecting unit 43 of the optical communication apparatus A continues monitoring the electric signal supplied from the O/E converter unit 11, and when the output level of the E/O converter unit 16 of the optical communication apparatus B is in the light-emitting state, it changes the detection state of the input break of the optical signal corresponding to dispersion amount control request pattern to "undetected".

The dispersion compensator 42 of the optical communication apparatus A terminates the rough control of the dispersion amount if it stops receiving the detection signal of the dispersion amount control request pattern from the optical input break detecting unit 43 because the detection state of the optical input break detecting unit 13 is changed to "undetected".

However, even if the rough control of the dispersion amount is terminated, the fine tuning of the dispersion amount is started because the dispersion amount of the transmission line 1 has not yet been optimally controlled.

As for the processing contents of the fine tuning of the dispersion amount on the transmission line 1, since they are the same as those of the foregoing embodiment 1, their description will be omitted.

Although the present embodiment 3 shows an example in which the optical communication apparatus A controls the dispersion amount on the transmission line 1, the control of the dispersion amount on the transmission line 2 is carried out in the same manner except that the processing contents of the optical communication apparatus A and the optical communication apparatus B are reversed.

Thus, the error rate can be minimized by controlling the dispersion amount on the transmission line 1 or 2 by the optical communication apparatus A or B.

It is not unlikely in the foregoing embodiment 1 or 2 that even if the dispersion compensator 21 controls the dispersion amount of the transmission line to the optimum value, the dispersion amount of the transmission line can shift from the optimum value because there are some cases where the optical signal of the dispersion amount control request pattern has already been transmitted before detecting the undetected state of the frame loss because the optical signal of the dispersion amount control request pattern is repeatedly transmitted until the frame loss becomes undetected state.

In contrast with this, the present embodiment 3 offers an advantage of being able to prevent the dispersion amount of the transmission line from shifting from the optimum value because it does not transmit the optical signal of the dispersion amount control request pattern repeatedly, but transmits the optical signal of the dispersion amount control request pattern again only when the frame loss detection continues after the dispersion compensator 21 controls the dispersion amount of the transmission line only once.

Incidentally, it is to be understood that a free combination of the individual embodiments, variations of any components of the individual embodiments or removal of any components of the individual embodiments are possible within the scope of the present invention.

INDUSTRIAL APPLICABILITY

An optical communication apparatus according to the present invention is applicable to an optical fiber communication system with a high network transmission rate, for example.

DESCRIPTION OF REFERENCE SYMBOLS

A, B optical communication apparatus; 1, 2 transmission line; 11 O/E converter unit (optical signal receiving device, optical input break detecting device, dispersion amount control request receiving device); 12 frame terminating unit (frame loss detecting device); 13 optical input break detecting unit (optical input break detecting device, dispersion amount control request receiving device); 14 frame loss detecting unit (frame loss detecting device); 15 pattern generating unit (dispersion amount control request transmission device); 16 E/O converter unit (dispersion amount control request transmission device, control completion notification device); 17 own-apparatus error rate monitoring unit; 18 error rate insertion control unit; 19 frame rate generating unit; 20 opposite apparatus error rate monitoring unit (dispersion amount control device); 21 dispersion compensator (dispersion amount control device); 31 pattern generating unit (dispersion amount control request transmission device); 32 optical attenuator (dispersion amount control request transmission device); 33 level monitor (optical input break detecting device, dispersion amount control request receiving device); 41 pattern generating unit (dispersion amount control request transmission device, control completion notification device); 42 dispersion compensator (dispersion amount control device); 43 optical input break detecting unit (optical input break detecting device, dispersion amount control request receiving device).

What is claimed is:

1. An optical communication apparatus comprising:
    an optical signal receiving device for receiving an optical signal transmitted from an opposite apparatus;
    an optical input break detecting device for detecting an input break of the optical signal received by the optical signal receiving device;
    a frame loss detecting device for detecting a frame loss of a data frame indicated by the optical signal received by the optical signal receiving device;
    a dispersion amount control request transmission device for transmitting, if the frame loss detecting device detects the frame loss in an undetected state of the input break of the optical signal by the optical input break detecting device, an optical signal of a specific pattern indicating a dispersion amount control request to the opposite apparatus at a bit rate lower than a bit rate for transmitting the optical signal of the data frame until the frame loss becomes undetected state;
    a dispersion amount control request receiving device for receiving the optical signal of the specific pattern which indicates the dispersion amount control request and is transmitted from the opposite apparatus; and
    a dispersion amount control device for controlling the dispersion amount of a transmission line between the optical communication apparatus and the opposite apparatus when the dispersion amount control request receiving device receives the optical signal of the specific pattern.

2. The optical communication apparatus according to claim 1, wherein
    the dispersion amount control device starts rough control of the dispersion amount on the transmission line when the dispersion amount control request receiving device receives the optical signal of the specific pattern, and seeks to minimize an error rate of the opposite apparatus by carrying out fine tuning of the dispersion amount on the transmission line when the optical signal of the specific pattern is no longer received.

3. The optical communication apparatus according to claim 1, wherein
    the dispersion amount control request transmission device transmits the optical signal of the specific pattern indicating the dispersion amount control request at a bit rate not greater than a quarter of the bit rate for transmitting the optical signal of the data frame.

4. The optical communication apparatus according to claim 1, wherein
    the dispersion amount control request transmission device controls a signal level of the optical signal to be transmitted in accordance with the specific pattern indicating the dispersion amount control request.

5. An optical communication apparatus comprising:
    an optical signal receiving device for receiving an optical signal transmitted from an opposite apparatus;
    an optical input break detecting device for detecting an input break of the optical signal received by the optical signal receiving device;
    a frame loss detecting device for detecting a frame loss of a data frame indicated by the optical signal received by the optical signal receiving device;
    a dispersion amount control request transmission device for transmitting, if the frame loss detecting device detects the frame loss in an undetected state of the input break of the optical signal by the optical input break detecting device, an optical signal of a specific pattern indicating a dispersion amount control request to the opposite apparatus at a bit rate lower than a bit rate for transmitting the optical signal of the data frame;
    a dispersion amount control request receiving device for receiving the optical signal of the specific pattern indicating the dispersion amount control request, which is transmitted from the opposite apparatus;
    a dispersion amount control device for controlling the dispersion amount of a transmission line between the optical communication apparatus and the opposite apparatus when the dispersion amount control request receiving device receives the optical signal of the specific pattern; and
    a control completion notification device for transmitting to the opposite apparatus an optical signal of a specific pattern indicating control completion of the dispersion amount after the dispersion amount control device controls the dispersion amount of the transmission line, wherein
    the dispersion amount control request transmission device transmits, if the frame loss detection continues at a stage where the optical signal of the specific pattern which indicates the control completion of the dispersion amount and is transmitted from the opposite apparatus is received, the optical signal of the specific pattern indicating the dispersion amount control request to the opposite apparatus again.

* * * * *